United States Patent Office 2,873,291
Patented Feb. 10, 1959

2,873,291

PROCESS FOR PREPARING BIS(CHLOROFORMATES) OF 1,2-DIOLS

Louis Spiegler, Woodbury, N. J., assignor to E. I. du Pont de Nemours and Company, Wilmington, Del., a corporation of Delaware No Drawing. Application July 5, 1957
Serial No. 669,963

5 Claims. (Cl. 260—463)

This invention is directed to an improved process for preparing bis(chloroformates) of 1,2-diols. In particular, it is directed to an improved process for making unusually pure ethylene bis(chloroformate) in unexpectedly high yields. These bis(chloroformates) are useful as intermediates for the preparation of plasticizers, plastics, lubricants, adhesives, fibers and elastomers.

The preparation of bis(chloroformates) from the simplest 1,2-diol, ethylene glycol, is old in the art. However, a consideration of this art will show that the attainment of high yields of pure product is still beset with many obstacles.

The synthesis of ethylene bis(chloroformate) by the reaction of phosgene with ethylene glycol $$HO-CH_2-CH_2-OH + 2Cl-\overset{O}{\underset{\|}{C}}-Cl \longrightarrow$$
$$Cl-\overset{O}{\underset{\|}{C}}-O-CH_2-CH_2-O-\overset{O}{\underset{\|}{C}}-Cl + 2HCl \quad (1)$$

was first reported by R. E. Oesper, W. Broker, and W. A. Cook (J. Am. Shem. Soc. 47, 2609 (1925)). They described its preparation in a yield of at least 75% by the slow addition of a dialkylaniline to a non-aqueous solution of ethylene glycol and phosgene present in molar ratio of 1:2. It had been previously disclosed (German Patents 117,624; 118,536; 118,537) that addition compounds formed by phosgene with substituted pyrazolones could be reacted with alcohols to give high yields of chloroformates; such addition compounds were either made in advance or they were formed in situ. Generally, about one mole of the substituted pyrazolone was used for each mole of alcohol present.

The preparation of ethylene bis(chloroformate) unfortunately, does not proceed without competition from the following side-reaction.

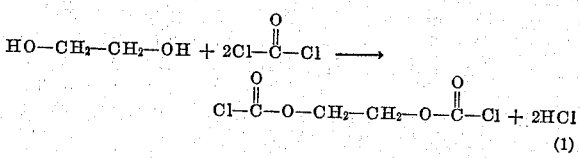

leading to the undesired formation of cyclic ethylene carbonate. Further complications can arise from the interaction of the hydrogen chloride evolved in (1) and (2) with ethylene glycol to form 2-chloroethanol and water $$HO-CH_2-CH_2-OH + HCl \rightarrow Cl-CH_2-CH_2-OH + H_2O \quad (3)$$

It is obvious, therefore, that the synthesis of ethylene bis(chloroformate) in high yields and free from wasteful side-reactions presents a difficult problem. Oesper et al. points out that application of the processes disclosed in the German art cited heretofore lead only to 40-60% yields of ethylene bis(chloroformate) due to the large amount of cyclic ethylene carbonate formed. Strain (U. S. 2,397,630) discloses that cyclic ethylene carbonate is almost exclusively formed if gaseous phosgene is passed into ethylene glycol at 40-50° C. When the reaction is carried out below about 20° C., ethylene bis(chloroformate) is formed in a more satisfactory manner; the product obtained is purified by repeated aqueous extractions.

The preparation of ethylene bis(chloroformate) by reacting ethylene glycol, presaturated with anhydrous hydrogen chloride, and phosgene (1:2.5 molar ratio) at 0-5° C. has been found to yield an undesirably high proportion of cyclic ethylene carbonate. For example, when ethylene glycol was added to phosgene over an hour period and subsequently reacted for 24 hours, a 92% yield of crude product was obtained consisting by weight: 90% ethylene bis(chloroformate), 9% cyclic ethylene carbonate, and 1.0% 2-chloroethyl chloroformate. When the order of addition was reversed the product contained 81% ethylene bis(chloroformate), 17% cyclic ethylene carbonate, and 2% 2-chloroethyl chloroformate.

Although the cyclic ethylene carbonate is much more water soluble than the ethylene bis(chloroformate), the removal of substantial amounts of the former requires an inconveniently large number of extractions. At about 3° C. the distribution ratio

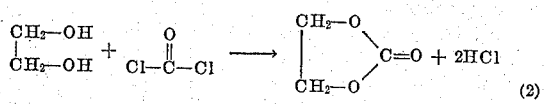

has been found to be approximately 3.5. As many as twelve aqueous extractions may be needed to reduce the ethylene carbonate content of a crude ethylene bis(chloroformate) sample from 13.2% to 0.6% (by weight).

Although the cyclic ethylene carbonate may be removed by aqueous washes (as described), the decreased yield of ethylene bis(chloroformate) is not economically attractive. Furthermore, the 2-chloroethyl chloroformate also present is insoluble in cold water and must be removed by fractional distillation of the crude ethylene bis(chloroformate) at reduced pressure. The rectification process may introduce additional problems. Küng (U. S. 2,377,085) discloses that ethylene bis(chloroformate) can undergo pyrolytic decomposition to give 1- and 2-chloroethyl chloroformates.

It has been found that although the slow addition of ethylene glycol to a large excess of phosgene at about 5° C. improves the yield of crude ethylene bis(chloroformate), it does not suppress the cyclic ethylene carbonate formation sufficiently. In the following Table I, some data are shown concerning the effect of excess phosgene on the course of the reaction; the molar ratio of phosgene to ethylene glycol given is the over-all ratio employed.

TABLE I

*The effect of phosgene content on the yield and purity of the ethylene bis(chloroformate) obtained*

| Molar Ratio, Phosgene/Ethylene Glycol | Percent Yield of Crude EBC (by weight) | Percent Cyclic Ethylene Carbonate in the Crude EBC [1] (by weight) |
|---|---|---|
| Theory: | | |
| 2.0 | | |
| 2.5 | | |
| 3.0 | 91.0 | 16 |
| 6.0 | 92.0 | 10 |
| 7.3 | 95.0 | 4.2 |
|  | 97.5 | 3.8 |

[1] Determined by infrared absorption analysis and verified by fractional distillations at 0.05–0.1 mm. of Hg.

It can be readily seen that the use of a very large excess of phosgene is not enough to provide a practical means for attaining high yields of very pure ethylene bis(chloroformate). The amount of cyclic ethylene carbonate is still appreciable. Furthermore, the output from the reaction zone will be unattractively low; the increased amount of phosgene will require more extensive facilities for recovery.

When ethylene glycol is substituted to give compounds of the structure

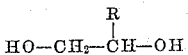

treatment with phosgene leads, as in the case of ethylene glycol itself, to cyclic carbonates

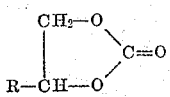

as well as the desired bis(chloroformate).

It is, therefore, an object of the present invention to provide an improved process for making bis(chloroformates) of 1,2-diols.

It is a further object of the present invention to provide an improved process for making essentially quantitative yields of crude ethylene bis(chloroformate) containing less than 2% by weight ethylene carbonate.

More specifically, the present invention is directed to a process for the preparation of bis(chloroformates) by separately adding a fluid 1,2-glycol of the structure

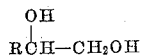

where R is an acyclic or alicyclic hydrocarbon radical or an acyclic hydrocarbon radical substituted by halogen or alkoxy or an alicyclic hydrocarbon radical substituted by halogen or alkoxy, and liquid phosgene in a molar ratio of not more than 1:2 to agitated liquid phosgene at such a rate that the unreacted glycol and agitated liquid phosgene exist as a single phase in the reactor, said phosgene in the reactor being present in at least molar equivalence to the maximum amount of the bis(chloroformate) which will be present in the reactor, the improvement consisting of minimizing the formation of cyclic 1,2-carbonate by adding 0.0025–0.0125 mole of a tertiary amine for each mole of phosgene present in the reactor.

According to the present invention, the glycol and liquid phosgene are added (in a molar ratio equal to 1:2 or less) at controlled rates in separate streams to a vigorously agitated pool of liquid phosgene which acts as a solvent for the bis(chloroformate) formed in the reaction. A catalytic amount of a tertiary amine has been introduced into this phosgene pool prior to the addition of the streams of the glycol and phosgene. This tertiary amine catalyst promotes the over-all yield of product and decreases the relative amount of cyclic carbonate formed. The hydrogen chloride evolved by the reacting mass is continuously purged with an inert gas, such as nitrogen, to minimize side-reactions leading to the formation of undesired chlorobodies. The reaction temperature is between about 0–8° C. When the concentration of the bis(chloroformate) in the reactor reaches 50–60% (by weight), the feed streams are shut off and the excess phosgene is evaporated. If pyridine is used as the catalyst, most of it may be removed from the product by adding an insoluble heavy metal salt (e. g., $SnCl_2 \cdot 2H_2O$) which forms an insoluble complex with the pyridine. The complex is filtered off to give the crude bis(chloroformate). This process is described as a batch operation; however, it may also be carried out in a continuous manner.

The presence of catalytic amounts of tertiary amines such as pyridine, N,N-dimethylaniline or triethylamine during the reaction of ethylene glycol with phosgene has a profound effect on both the yield of crude product and the relative amount of cyclic ethylene carbonate obtained. In Example 1 of this application, a 99% yield of crude ethylene bis(chloroformate) containing only 0.9% by weight cyclic ethylene carbonate is achieved when 0.00613 mole of pyridine is introduced for each mole of phosgene present in the reaction zone; when the same reaction procedure is carried out in the absence of a catalyst, a 94% yield of crude ethylene bis(chloroformate) is obtained which analyzes for a 7.1% cyclic ethylene carbonate content. In Example 3, the introduction of only 0.00306 mole of pyridine for each mole of phosgene present in the reaction zone allows a crude product to be made containing only 0.3% cyclic ethylene carbonate. Repetition of the procedure in the absence of pyridine leads to a crude product with a 5.1% cyclic ethylene carbonate content; the use of an increased excess of phosgene in the pool in the absence of any catalyst does not decrease the cyclic ethylene carbonate content in the crude product.

The amount of catalyst needed will depend to a certain extent on the rate at which the glycol is introduced into the phosgene. In general, the use of 0.0025–0.0125 mole of catalyst for each mole of phosgene in the reaction zone gives satisfactory results. Employment of a molar ratio above 0.0125 appears to provide no added advantage. When the catalyst/phosgene molar ratio is below 0.0025, the catalytic effect begins to fall off with a consequent decrease in the yield of the bis(chloroformate) and an increase in the relative amount of cyclic carbonate present.

The catalyst may be added to the phosgene in the reactor at any temperature between about −50 to 8° C. When pyridine is used, it reacts with the phosgene to form an insoluble complex. Pyridine also forms a complex with ethylene bis(chloroformate) which complex is soluble in excess ethylene bis(chloroformate). Due to the large excess of phosgene used in the present invention, the pyridine in the reaction zone is probably largely present as the pyridine-phosgene complex. However, it appears that both the pyridine-phosgene and pyridine-ethylene bis(chloroformate) complexes provide the catalytic activity which promotes the over-all yield of ethylene bis(chloroformate) and decreases the relative amount of ethylene carbonate formed. It has been observed that the rate of hydrogen chloride evolution during the phosgenation is definitely greater when a catalytic amount of pyridine is present than in its absence.

It is to be understood that the tertiary amine catalysts useful in the present invention will, in general, form complexes with the substituted ethylene bis(chloroformates) described above. Both the tertiary amine-phosgene and the tertiary amine-substituted ethylene bis(chloroformate) complexes appear to provide the catalytic activity which promotes the over-all yield of bis(chloroformate) and decreases the relative amount of the substituted cyclic ethylene carbonate formed.

The tertiary amine-phosgene complex and the tertiary amine bis(chloroformate) complexes can be prepared and isolated and subsequently introduced into the phosgene in the reactor with stirring prior to the beginning of the glycol addition. The tertiary amine may be added to the phosgene in the reactor with vigorous agitation to form the complex in situ prior to the start of the glycol addition; in a continuous process, it can be continually or intermittently introduced to maintain the level of catalyst concentration. Since phosgene is an extremely toxic gas, it is preferred that a small amount of the bis(chloroformate) be added to the empty reactor followed by the introduction of the desired amount of the tertiary amine; the tertiary amine bis(chloroformate) complex is formed in excess bis(chloroformate). Liquid phosgene is then introduced with strong agitation; the tertiary amine complex formed is in a fine state of subdivision and thoroughly dispersed throughout the excess phosgene. In a continuous process, a solution of the tertiary amine bis(chloroformate) complex in excess bis(chloroformate) may be continually or intermittently introduced into the reaction zone to maintain the desired level of catalyst concentration.

The catalysts useful in this invention must be tertiary amines containing no reactive substituents (such as active hydrogen atoms as determined by the Zerewitinoff procedure). Secondary or primary amines will react with the bis(chloroformate) to form substituted urethanes and with the phosgene to form substituted ureas. The preferred tertiary amine is pyridine. Representative examples of other tertiary amines which may be employed are: 3-picoline; quinaldine; quinoline; triethylamine; tri-n-propylamine; 3,4-lutidine; N,N-dimethyl-o-toluidine; N,N-dimethylaniline; N,N-dimethylbenzylamine; N-ethyl-N-methylaniline; N,N-dimethyl-p-toluidine; tri-n-butylamine; N,N-dimethyl-p-chloroaniline; N-methylmorpholine; p-bromo-N,N-dimethylaniline. Mixtures of tertiary amines may also be used.

Many amines which differ widely in basic strength are useful as catalysts in this invention. Triethylamine ($pKa=10.8$), pyridine ($pKa=5.2$), and N,N-dimethylaniline ($pKa=4.2$) are about equally effective. p-Bromo-N,N-dimethylaniline ($pKa=2.8$) is not quite as active, however, as the previously-mentioned amines. When p-nitro-N,N-dimethylaniline ($pKa=0.9$) is used in place of N,N-diethylaniline, twice as much carbonate is formed. The use of tertiary amines with a $pKa<2$ is not recommended.

Two moles of phosgene are required for every mole of the glycol to make the bis(chloroformate); the molar ratio of phosgene:glycol used in the process must be at least 2:1. In the operation of this process a ratio of at least 3:1 is employed. The excess phosgene serves as the solvent and is present in the reactor throughout the course of the reaction.

In order to obtain the best results from the use of the tertiary amine catalysts, it is essential that local excess concentrations of the glycol (relative to the phosgene) be avoided. The glycol must not be allowed to exist as a separate phase in the reaction mixture and it should not be present in excess of its solubility in phosgene.

As a preferred procedure, the glycol is introduced through as small an orifice as possible into a tremendous molar excess of phosgene at such a rate that its solubility in the phosgene is not exceeded. Simultaneously, phosgene is separately added at a rate sufficient to keep the phosgene content in the reactor essentially constant; allowance is made for both the phosgene consumed in forming the bis(chloroformate) and the phosgene carried out by the nitrogen sweep. The low solubility of the glycols in the phosgene makes it necessary that their addition be made by separate streams. The phosgene and the glycol may be introduced continually or intermittently. The phosgene may be introduced continually while the glycol is added at frequent intervals in small portions as a preferred procedure. The phosgene may be added at frequent intervals in small amounts while a continuous addition of the glycol is maintained. It is, furthermore, possible to have all the phosgene present in the reactor and introduce only the glycol; however, this arrangement suffers from the limitation that it must of necessity be a batch process.

When the glycol and phosgene are introduced simultaneously in the preferred manner, the phosgene supply in the reactor remains essentially constant and a continuous operation is permitted. The phosgene solution of bis(chloroformate) is removed from the reaction vessel at a rate equal to the sum of the reactants being introduced (taking into account the hydrogen chloride evolved during the reaction). The contact time in the reaction zone will be selected so that substantially all the 1,2-diol glycol is consumed; there should be no glycol in the effluent from the reaction vessel.

It is a distinct advantage of the present invention that no solvent other than the excess liquid phosgene is required. The low-boiling phosgene is readily removed from the bis-chloroformate) at the end of the reaction. On the other hand, mutual solvents for the glycol and phosgene (such as 1,4-dioxane in the case of ethylene glycol) are not only more troublesome to remove but they may affect the course of the reaction. When ethylene glycol and 1,4-dioxane are employed, the addition of pyridine to the reaction mixture is marked by a decrease in the yield of ethylene bis(chloroformate) which is accompanied by the formation of low-boiling products which are high in chlorine content. It is possible that the hydrogen chloride evolved during the reaction is partly dissolved in the dioxane; the increased hydrogen chloride concentration promotes reactions such as (3) which lead to the formation of chlorobodies.

The reaction zone should be swept continuously by nitrogen in order to keep the concentration of hydrogen chloride as low as possible. A flow rate of about 0.25 cu. ft./hr. per pound of reactants is satisfactory. This action will minimize the possibility of obtaining 2-chloroethyl chloroformate as a by-product. The nitrogen sweep will entrain some of the phosgene; as a result, the amount of phosgene introduced must not only compensate for the phosgene reacting with the ethylene glycol but also for the phosgene lost with the hydrogen chloride.

The temperature should be kept between about 0 and 5° C. for optimum results. Above 5° C. the vapor pressure of phosgene increases rapidly (B. P. 8.3° C.) and increased volatilization losses will occur. Below 0° C. the rate of reaction becomes slower, and longer time cycles will be consequently required.

The equipment suitable for carrying out the process of the present invention must be inert to phosgene and low concentrations of hydrochloric acid. Glass or enamel lined reaction vessels are recommended. The toxic nature of phosgene requires that special attention be paid to gas-tight fittings and valves. The exit gas must be passed through a scrubbing tower containing ammonia in order to get rid of the phosgene entrained. The agitator should be capable of providing a mixing intensity of about 25 H. P./1000 gal. Vigorous stirring is essential in order to keep the catalyst complex well dispersed and to avoid any local excess of ethylene glycol which will promote cyclic ethylene carbonate formation. Improved mixing may be achieved by introducing the phosgene and ethylene glycol under pressure.

Representative examples of the 1,2-diols which are useful in the process of the present invention are: ethylene glycol, 1,2-propanediol, 3-chloro-1,2-propanediol, 1,2-butanediol, 3,4-dibromo-1,2-butanediol, 2-methyl-3,4-butanediol, 1-methoxy-3,4-butanediol, 1,2-hexanediol, 2,2-dimethyl-3,4-butanediol, and 1,2-decanediol.

For some purposes it may be desirable to reduce the trace amount of catalyst present in the ethylene bis(chloroformate) obtained.

A triple extraction of the crude product by an equal volume of ice water followed by drying over silica gel will substantially remove the water-soluble tertiary amines such as pyridine. This procedure is not preferred for large-scale operation because of the difficulty of minimizing product retention by the silica gel.

It has now been found that the addition of about 1% (by weight) of certain insoluble heavy metal salts to the crude bis(chloroformate) obtained will purify it by combining with the pyridine catalyst to form an insoluble adduct. Example 4 illustrates the use of the preferred reagent stannous chloride dihydrate at room temperature. The heavy metal salt is generally introduced with agitation at room temperature. The mass is then agitated for about 4 hours and subsequently allowed to stand. The insoluble material is removed by filtration. The agitated mass can be heated up to about 50° C. Agitation for about 1 hour at 50° C. will be satisfactory. The mass is subsequently cooled to room temperature and filtered. The time cycle required at 50° C. will depend somewhat on the excess of heavy metal salt used and the fineness of its dispersion.

It is preferred that the heavy metal salt be insoluble in the bis(chloroformate) in order to minimize the problem of removing the excess salt from the latter. Soluble salts such as cuprous chloride may be used if they are of low volatility compared to the bis(chloroformate). Soluble salts such as titanium tetrachloride and stannic chloride are unsuitable because they will distill over in the case of ethylene bis(chloroformate) if rectification is attempted. In any case, the adduct of the metal salt and pyridine must be thermally stable at 50° C.; adducts made from phosphorus trichloride, calcium chloride, zinc chloride, and phosphorus oxychloride are not stable enough to be useful. Salts suitable for use in purifying the bis(chloroformate) from pyridine are plumbous chloride, cuprous chloride and stannous chloride.

The following representative examples further illustrate the present invention:

EXAMPLE 1

A. 0.98 part (0.012 mole) of pyridine (containing preferably no more than 0.03% water by weight) is added with stirring to 200 parts (2.025 moles) of liquid phosgene maintained in a glass or enamel-lined reaction vessel at −40 to −50° C.; the molar ratio of pyridine: phosgene initially present is 0.00613. The heterogeneous mixture obtained is allowed to warm up until its temperature is about 0° C.

Then phosgene and ethylene glycol are separately introduced into the reaction vessel over a period of 114 minutes. The phosgene is continually added at a rate of 1.0 part (0.0041 mole) per minute. The ethylene glycol is introduced through a small orifice once a minute; 0.27 part (0.00436 mole) is added each time.

The reactants are always vigorously agitated and a continual stream of nitrogen is passed through the mixture to sweep out the hydrogen chloride evolved. The phosgene solvent is brought to reflux by the heat given off during the reaction. In all, 31 parts (0.5 mole) of ethylene glycol and 114 parts (1.155 moles) of phosgene are introduced.

When the addition is complete, the reaction mixture is stirred for an additional half-hour. It is then allowed to warm to room temperature while being swept with nitrogen. The phosgene is boiled off leaving a 99.2% yield of crude ethylene bis(chloroformate) which contains 0.9% ethylene carbonate. The product is a clear liquid which on exposure to air becomes cloudy but does not fume.

B. A control experiment is performed as above but in the absence of pyridine. A 94% yield of crude ethylene bis(chloroformate) is obtained which contains 7.1% ethylene carbonate.

C. The procedure of part A is carried out using 4.9 parts (0.062 mole) of pyridine; the molar ratio of pyridine:phosgene initially present is 0.0306. A quantitative yield of crude ethylene chloroformate is obtained which analyzes for a 1.5% ethylene carbonate content.

D. The procedure of part A is repeated except for a greater feed rate. The molar ratio of pyridine:phosgene initially present is 0.00613. The phosgene is continually added at a rate of 0.408 part (0.00413 mole) every 15 seconds. The ethylene glycol is introduced through a small orifice once every 15 seconds; 0.11 part (0.00177 mole) is added each time. In all, 31 parts (0.50 mole) of ethylene glycol and 114 parts (1.155 moles) of phosgene are introduced over a 70-minute period. A substantially quantitative yield of crude ethylene chloroformate is obtained which analyzes for a 1.6 ethylene carbonate content.

EXAMPLE 2

0.98 part (0.0124 mole) of pyridine (containing preferably no more than 0.03% water by weight) is added with stirring to 100 parts (1.012 moles) of liquid phosgene maintained in a glass or enamel-lined reaction vessel at −40 to −50° C.; the molar ratio of pyridine:phosgene initially present is 0.01226. The mixture is allowed to warm up until its temperature is about 0° C.

Then phosgene and ethylene glycol are separately introduced into the reaction vessel over a period of 210 minutes. The phosgene is continually added at a rate of 0.405 part (0.0041 mole) per half-minute. The ethylene glycol is introduced through a small orifice once every 30 seconds; 0.11 part (0.00177 mole) is added each time.

The reactants are always vigorously agitated and a continuous stream of nitrogen is passed through the mixture to sweep out the hydrogen chloride evolved. The excess phosgene is brought to reflux by the heat given off during the reaction. In all, 46.5 parts (0.75 mole) of ethylene glycol and 170 parts (1.72 moles) of phosgene are introduced.

When the addition is complete, the reaction mixture is stirred for an additional half-hour. It is subsequently allowed to warm to room temperature while being swept with nitrogen. The phosgene is boiled off leaving a 140.2 parts (100% of theory) yield of crude ethylene bis(chloroformate) which analyzes for a 0.4% ethylene carbonate content.

EXAMPLE 3

0.245 part (0.0031 mole) of pyridine (containing preferably no more than 0.03% water by weight) is added with stirring to 100 parts (1.012 moles) of liquid phosgene maintained in a glass or enamel-lined reaction vessel at −40 to −50° C.; the molar ratio of pyridine:phosgene initially present is 0.00306. The mixture is allowed to warm up until its temperature is about 0° C.

Then phosgene and ethylene glycol are separately introduced into the reaction vessel over a period of 140 minutes. The phosgene is continually added at a rate of 0.2025 part (0.00204 mole) every 15 seconds. The ethylene glycol is introduced through a small orifice once every 15 seconds; 0.0556 part (0.000897 mole) is added each time.

The reactants are always vigorously agitated and a continual stream of nitrogen is passed through the mixture to sweep out the hydrogen chloride evolved. The excess phosgene is brought to reflux by the heat given off during the reaction. In all, 31 parts (0.5 mole) ethylene glycol and 114 parts (1.155 moles) of phosgene are introduced.

When the addition is complete, the reaction mixture is stirred for an additional half-hour. It is then allowed to warm to room temperature while being swept with nitrogen. The phosgene is boiled off leaving 91 parts of crude ethylene bis(chloroformate) analyzing for a 0.7% ethylene carbonate content.

EXAMPLE 4

A. 0.245 part of pyridine (containing preferably no more than 0.03% water by weight) is added with stirring to 100 parts (1.012 moles) of liquid phosgene maintained in a glass or enamel-lined reactor at −40 to −50° C.; the molar ratio of pyridine:phosgene initially present is 0.00306. The mixture is allowed to warm up until its temperature is about 0° C.

Then phosgene and ethylene glycol are separately introduced into the reaction vessel over a period of 280 minutes. The phosgene is continually added at a rate of 0.2025 part (0.00204 mole) every 30 seconds. The ethylene glycol is introduced through a small orifice once every 30 seconds; 0.0556 part (0.000897 mole) is added each time.

The reactants are always vigorously agitated and a continual stream of nitrogen is passed through the mixture to sweep out the hydrogen chloride evolved. The excess phosgene is brought to reflux by the heat given off during the reaction. In all, 31 parts (0.5 mole) of ethylene glycol and 114 parts (1.15 moles) of phosgene are introduced.

When the addition is complete, the reaction mixture is stirred for an additional half-hour. The 94 parts of crude ethylene bis(chloroformate) obtained after removal of the excess phosgene has less than 1% by weight ethylene carbonate content. Substantially all the chlorine present in the product is hydrolyzable chlorine.

B. The procedure of part 3A is carried out without the use of pyridine. The crude ethylene bis(chloroformate) obtained analyzes for a 5.1% ethylene carbonate content.

C. The procedure of part 3B is repeated except using 200 parts (2.025 moles) of phosgene initially. The crude ethylene bis(chloroformate) obtained analyzes for 5.6% ethylene carbonate content.

D. The procedure of part 3B is repeated except using 300 parts (3.036 moles) of phosgene initially. The crude ethylene bis(chloroformate) obtained analyzes for 5.6% ethylene carbonate content.

EXAMPLE 5

A. *Precipitation of pyridine with heavy metal salts.—* 50 parts of crude ethylene bis(chloroformate) containing 0.123% pyridine (by weight) and 1.4% cyclic ethylene carbonate (by weight) are agitated for 4 hours under nitrogen at room temperature with 0.35 part of pulverized stannous chloride dihydrate ($SnCl_2 \cdot 2H_2O$).

After standing overnight, the mixture is filtered. Analysis of the separated solid and liquid fractions shows that the bulk of the pyridine originally present in the ethylene bis(chloroformate) liquid is contained in the collected solids admixed with excess stannous chloride. Trace amounts of pyridine complexed with tin halide remain in the colorless ethylene bis(chloroformate). Flash distillation at low pressure (B. P. 41°C./0.04 mm., 60.5° C./1 mm.) gives a 99% recovery of colorless ethylene bis(chloroformate) which contains no metal or pyridine; obtained analysis for 1.5% ethylene carbonate.

B. Similar results are obtained using 0.3 part of cuprous chloride—($Cu_2Cl_2$) and 50 parts of crude ethylene bis(chloroformate).

In this instance, a considerable fraction of the pyridine complex remains in solution as evidenced by coloration of the ethylene bis(chloroformate) liquid. Flash distillation, however, gives a 98% recovery of colorless ethylene bis(chloroformate) containing neither copper nor pyridine.

C. 50 parts of crude ethylene bis(chloroformate) is slurried with 3 parts of calcium chloride as described above in 5A. The clear colorless filtrate thus obtained is substantially free of pyridine.

EXAMPLE 6

0.62 part (0.0062 mole) of triethylamine is added to a dry reaction vessel cooled to about −50° C. Then 100 parts (1.012 moles) of phosgene are introduced (the molar ratio of triethylamine:phosgene initially present is 0.00613). A heterogeneous mixture is obtained containing suspended white solids. A nitrogen sweep is begun and maintained continually thereafter. The contents of the vessel are allowed to warm to 3–8° C.

Then phosgene is added continuously at the rate of 0.5 part (0.00205 mole) per minute. Ethylene glycol is introduced separately once a minute in portions of 0.135 part (0.00218 mole) per minute over a period of 2 hours. During this time the reactants are vigorously agitated; the hydrogen chloride evolved during the reaction is swept out by the continual nitrogen stream. Most of the catalyst complex appears to dissolve soon after the addition of ethylene glycol is begun. In all, 15.5 parts (0.25 mole) of ethylene glycol and 65 parts (0.66 mole) phosgene are introduced. When the addition is complete, the reaction mixture is stirred for an additional half-hour. It is then allowed to warm to room temperature while being swept with nitrogen. The phosgene is boiled off to yield ethylene bis(chloroformate) which analyzes for 1.3% cyclic ethylene carbonate content.

EXAMPLE 7

The procedure of Example 6 is repeated except that 0.75 part (0.0062 mole) of dimethylaniline is used instead of 0.0062 mole of triethylamine. The dimethylaniline appears to form a greenish-colored solid when it is added to the phosgene. During the introduction of the ethylene glycol most of this solid dissolves. The ethylene bis(chloroformate) obtained analyzes for a 1.3% cyclic ethylene carbonate content.

EXAMPLE 8

The procedure of Example 6 is repeated except that 0.49 part (0.0062 mole) of pyridine is used in place of the 0.62 part (0.0062 mole) of triethylamine. The ethylene bis(chloroformate) obtained analyzes for 1.2% cyclic ethylene carbonate content.

EXAMPLE 9

The procedure of Example 6 is repeated except that 1.47 parts (0.0063 mole) of p-bromo-N,N-dimethylaniline is used in place of the 0.62 part (0.0062 mole) of triethylamine. The ethylene bis(chloroformate) obtained analyzes for a 1.7% cyclic ethylene carbonate content.

EXAMPLE 10

A. 0.49 part (0.0062 mole) of pyridine is added to a dry reaction vessel cooled to about −50° C. Then 100 parts (1.012 moles) of phosgene are introduced (the molar ratio of pyridine:phosgene initially present is 0.00613). A heterogeneous mixture is obtained containing suspended white solids. A nitrogen sweep is begun and maintained continually thereafter. The contents of the vessel are allowed to warm to 3–8° C.

Then phosgene is added continuously at the rate of 0.5 part (0.00205 mole) per minute. 1,2-propylene glycol is introduced separately once a minute in portions of 0.166 part (0.00218 mole) per minute over a period of 2 hours. During this time the reactants are vigorously agitated; the hydrogen chloride evolved during the reaction is swept out by the continual nitrogen stream. In all, 20.0 parts (0.263 mole) of propylene glycol and 65 parts (0.66 mole) phosgene are introduced. When the addition is complete, the reaction mixture is stirred for an additional half-hour. It is then allowed to warm to room temperature while being swept with nitrogen. The phosgene is boiled off to give an over-all 84% yield of product containing 17% cyclic carbonate.

B. The procedure of part A is repeated except that the pyridine is omitted. The product (obtained in a 78% over-all yield) contains 27% cyclic carbonate.

The embodiments of the invention in which an exclusive property or privilege is claimed are defined as follows:

1. In the process of preparing bis(chloroformates) of 1,2-diols by separately adding a fluid 1,2-diol of the structure

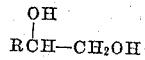

wherein R is taken from the group consisting of acyclic hydrocarbon radicals, acyclic hydrocarbon radicals substituted by halogen, acyclic hydrocarbon radicals substituted by an alkoxy radical, and, liquid phosgene in a molar ratio of not more than 1:2 to agitated liquid phosgene, the unreacted glycol and the said agitated liquid phosgene existing as a single phase, said agitated liquid phosgene being present in at least molar equivalents to the maximum amount of the bis(chloroformate) present, the improvement consisting of minimizing the formation of cyclic 1,2-carbonate by adding 0.0025 to 0.0125 mol of a tertiary amine for each mol of said agitated liquid phosgene, the reaction temperature being between about 0° C. to 8° C.

2. The process of claim 1 wherein the tertiary amine is pyridine.

3. The process of claim 1 wherein hydrogen chloride is continually removed from the reaction zone.

4. In the process of preparing ethylene bis(chloroformate) by separately adding ethylene glycol and phosgene in a molar ratio of not more than 1:2 to agitated phosgene while maintaining the concentration of unreacted glycol at no more than 2% by weight of phosgene in said reactor, said phosgene in the reactor being present in at least molar equivalents to the maximum amount of ethylene bis(chloroformate) present in the reactor, the improvement which consists of adding 0.0025–0.0125 mole of a tertiary amine for each mole of said agitated phosgene initially present in the reactor at a temperature of not more than about 8° C., to produce a phosgene solution of ethylene bis(chloroformate) containing less than 2% cyclic ethylene carbonate by weight of bis(chloroformate) followed by removing said phosgene from said solution.

5. The process of claim 2 wherein the product bis(chloroformate) it agitated with stannous chloride dihydrate from which it is subsequently separated.

References Cited in the file of this patent

UNITED STATES PATENTS

| 2,397,630 | Strain | Apr. 2, 1946 |
| 2,517,965 | Bohl | Aug. 8, 1950 |
| 2,808,371 | Stevens | Oct. 1, 1957 |

OTHER REFERENCES

Oesper et al.: J. A. C. S. 47, 2609–10 (1925).